(12) United States Patent
Sharma et al.

(10) Patent No.: US 9,072,018 B2
(45) Date of Patent: Jun. 30, 2015

(54) WIRELESS CHANNEL SWITCHING USING CO-LOCATED RADIOS

(75) Inventors: Puneet Sharma, Menlo Park, CA (US);
Sung-Ju Lee, San Francisco, CA (US);
Jeongkeun Lee, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1430 days.

(21) Appl. No.: 12/433,392

(22) Filed: Apr. 30, 2009

(65) Prior Publication Data

US 2010/0278117 A1   Nov. 4, 2010

(51) Int. Cl.
| | |
|---|---|
| H04L 12/28 | (2006.01) |
| H04W 36/06 | (2009.01) |
| H04J 1/16 | (2006.01) |
| H04W 24/00 | (2009.01) |
| H04W 72/00 | (2009.01) |
| H04W 88/06 | (2009.01) |

(52) U.S. Cl.
CPC ............. *H04W 36/06* (2013.01); *H04W 24/00* (2013.01); *H04W 72/00* (2013.01); *H04W 88/06* (2013.01)

(58) Field of Classification Search
USPC .................................. 370/278, 329, 218, 252
See application file for complete search history.

(56) References Cited

U.S. PATENT DOCUMENTS

| | | | | |
|---|---|---|---|---|
| 7,873,377 | B1* | 1/2011 | Cocos ............................ | 455/515 |
| 2002/0155818 | A1* | 10/2002 | Boros et al. ................... | 455/67.4 |
| 2004/0033077 | A1* | 2/2004 | Kim et al. ....................... | 398/72 |
| 2005/0245269 | A1* | 11/2005 | Demirhan et al. .......... | 455/452.1 |
| 2006/0171326 | A1* | 8/2006 | Durand et al. ................. | 370/252 |
| 2006/0251025 | A1* | 11/2006 | Kwon et al. ................... | 370/334 |
| 2008/0250142 | A1* | 10/2008 | Magnusson et al. .......... | 709/225 |
| 2009/0201801 | A1* | 8/2009 | Ono ............................... | 370/221 |
| 2014/0317315 | A1* | 10/2014 | Duchesneau ................. | 709/250 |

OTHER PUBLICATIONS

Ahmed, N. et al., "SMARTA: a Self-Managing Architecture for Thin Access Points", ACM CoNEXT, Lisbon, Portugal, Dec. 2006, p. 1-12.
Mishra, A. et al., "A Client-Driven Approach for Channel Management in Wireless LANs", IEEE INFOCOM, Barcelona, Spain, Apr. 2006, p. 1-13.
Cheng, Y. et al., "Jigsaw: Solving the Puzzle of Enterprise 802.11 Analysis", ACM SIGCOMM, Pisa, Italy, Sep. 2006, p. 1-12.
http://www.xirrus.com/, Apr. 30, 2009.
Lee, J. et al., "RSS-based Carrier Sensing and Interference Estimation in 802.11 Wireless Networks", Proc. IEEE SECON 2007, San Diego, CA, Jun. 2007, p. 1-10.
Zhang, J. et al., "A Practical SNR-Guided Rate Adaptation," in Proc. IEEE INFOCOM 2008 p. 146-150.
http://www.netgate.com/product_info.php?cPath=27_43&products_id=135, Apr. 30, 2009.

(Continued)

*Primary Examiner* — John Pezzlo
(74) *Attorney, Agent, or Firm* — Mannava & Kang

(57) ABSTRACT

A channel management system in a wireless network includes a master radio and a surrogate radio. The master radio performs data communication with one or more clients on a first channel in the wireless network, and the surrogate radio simultaneously scans other channels in the wireless network. A channel manager determines if a channel switch is needed, and the data communication is switched to a second channel based on the scanning of the other channels.

20 Claims, 3 Drawing Sheets

(56) References Cited

OTHER PUBLICATIONS

Broustis, I. et al., "MDG: Measurement-Driven Guidelines for 802.11 WLAN Design," in Proc. ACM Mobicom, Montreal, Canada, Sep. 2007, p. 1-12.

Federal Communications Commission, Memorandum Opinion and Order FCC 06-96, DFS order, Jun. 30, 2006, p. 1-52.

IEEE 802.11k-2008—Amendment 1: Radio Resource Measurement of Wireless LANs., Jun. 2008, p. 1-244.

Bicket, J. et al., "Architecture and Evaluation of an Unplanned 802.11b Mesh Network", Proc. ACM Mobicom 2005, Aug. 2005, p. 1-12.

* cited by examiner

WIRELESS CHANNEL SWITCHING USING CO-LOCATED RADIOS

BACKGROUND

Wireless Local Area Networks (WLANs), which may be enterprise networks, wireless mesh networks, first-responder networks, home networks, etc., are highly popular and are widely used in commercial as well as residential environments. A main challenge in providing high performance in wireless networks is overcoming variations in wireless channel conditions. Because of the shared medium, the wireless channel quality varies over time due to contention, interference, fading, etc.

In order to provide reliable connectivity and quality of service, a wireless system (e.g., an access point and clients in the WLAN) switches (i.e., changes) the channel it is operating on when the system performance degrades or military radar is detected in UNI-2 band in the current channel. When selecting a new, better channel, the quality of all the other channels is determined by scanning all the other channels. The scanning time is proportional to the number of channels, and the number of channels is very large with new standards, such as 802.11n. Thus, the scanning time is long, which causes the system to stay in a degraded performance state until the switch to a new channel can be made.

As a wireless radio in the access point can only transmit or receive on one channel, it cannot perform data communication on a single channel and scan the other channels at the same time. Hence, during the channel scanning, data communication must stop, and this leads to disruption of connectivity and service. This delay severely impacts network services, such as voice over IP (VoIP) or streaming video, provided via the wireless network.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a surrogate radio is co-located with a master radio in wireless nodes, such as in an access point (AP) or a client. This provides the ability for the surrogate radio to perform channel scanning simultaneously while the master radio is busy with data communication in a wireless network. If channel degradation occurs for the data communication from the master radio, a new channel can be immediately selected without having to wait for a scan of all other channels to be completed. Then, the master radio can switch the data communication to the new channel. In another embodiment, to switch the data communication to the new channel, the roles between the master radio and the surrogate radio are swapped so the surrogate radio becomes the new master radio. Then, the data communication commences using the new master. The role switching allows faster migration to a new channel.

Also, according to an embodiment, the surrogate radio proactively performs a Channel Availability Check (CAC). Because of an FCC (Federal Communications Commission) regulation, WLANs are required to monitor radar signals in the 5 Ghz UNI-2 band before starting data communication on a channel in the band. The CAC time is required to be at least 60 seconds, so a channel must be monitored for at least 60 seconds for radar signals before switching data communications to the channel. The surrogate radio performs the CAC for each channel prior to determining that a channel switch is needed, so a switch can be made to a new channel without having to wait for the CAC. The CAC is performed periodically for each channel so when a channel switch is needed a current CAC may have already been performed.

Figure 1:
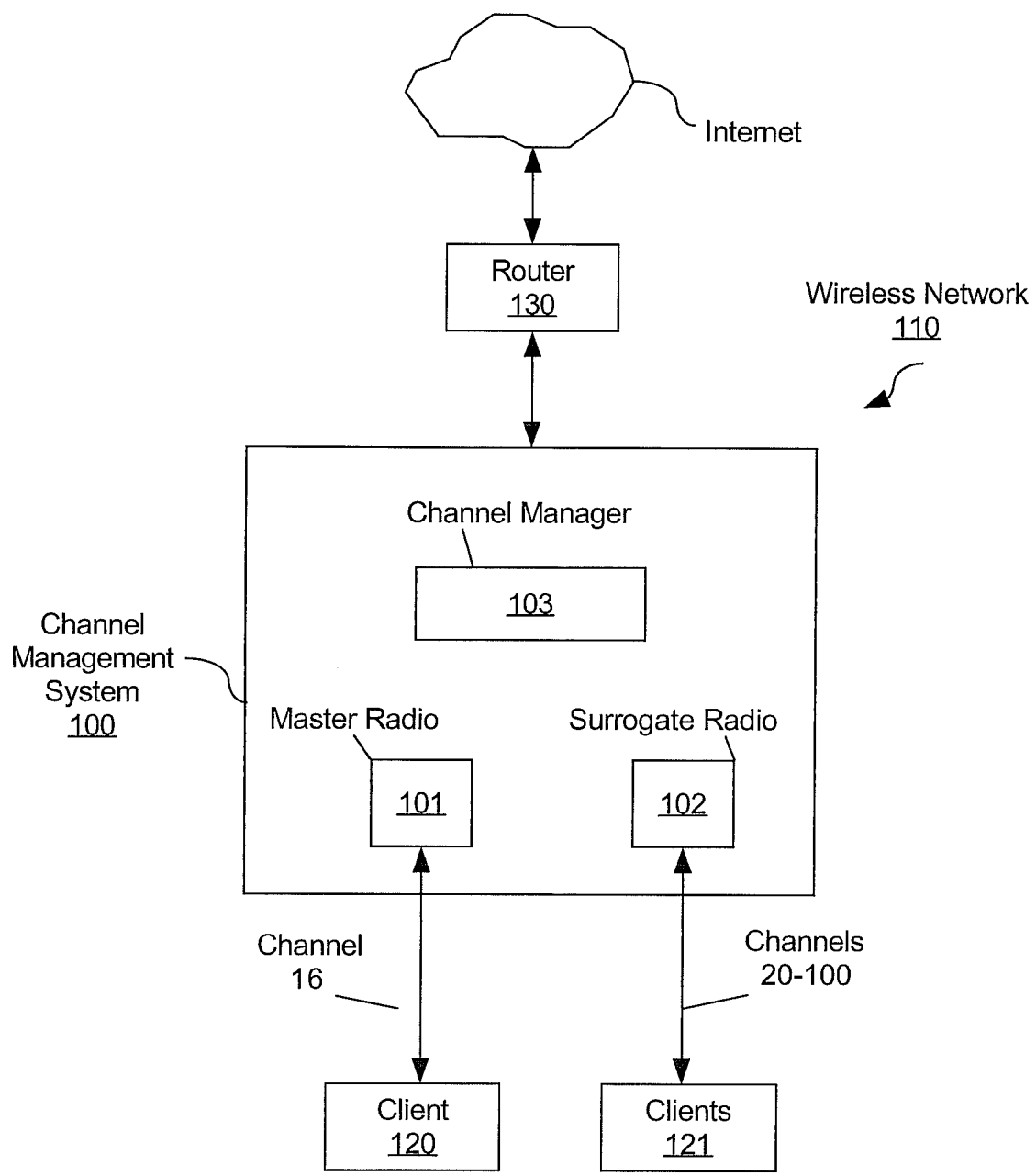
FIG. 1 illustrates a channel management system, according to an embodiment.

FIG. 1 illustrates a channel management system 100 in a wireless network 110. The channel management system 100 includes a master radio 101, a surrogate radio 102, and a channel manager 103. In one embodiment, the channel management system 100 is a multi-radio AP. One radio performs the role of master radio while the other radio acts as surrogate for channel scanning. A client 120 may connect to the channel management system 100 to get access to the wireless network 110. For example, the client 120 may connect to the channel management system 100 to send and receive data in the wireless network 110. This may include communicating with other clients 121 in the wireless network 110, or other network devices or other networks. For example, the wireless network 110 may be connected to the Internet via a router 130, and the client 120 can access the Internet via the channel management system 100. A client is a device that is operable to connect to the network, for example, using a wireless network card (WNIC). Note that the master radio 101 may be connected to multiple clients for sending and receiving data.

A radio is an electronic device which transmits wireless signals on a particular channel in the wireless network 110. A radio is connected to an antenna to send the wireless signals. The radio may include a chip connected to the antenna that generates the signals to transmit in the wireless network 110. Multiple radios can be connected to a single antenna or each radio can have their own antenna. The radio may also be connected to an interface, usually via a wired connection, and the interface is a device that is assigned a MAC (Media Access Control) address and provides layer 1 and/or layer 2 (from the OSI model) data communications in the network. In most instances, the radio and the interface are located in a single network device, such as an AP. An AP is a network device that allows wireless communication devices, such as the clients 120-121, to connect to the wireless network 110 typically using a protocol or standard like IEEE 802.11.

The master radio 101 is a radio that provides data communication with a client, such as the client 120, via a channel in the wireless network 110. The data communication includes the exchange of information, such as information in packets, via the wireless medium. The information may include information for applications or data services or any other type of content. A channel is a frequency or a frequency band. Channels may be orthogonal or overlapping.

The surrogate radio 102 is a radio that performs scanning of channels in the wireless network 110. These are channels between the surrogate and the client 120 and other clients as needed. Scanning includes determining channel metrics for the channels. The metrics may include bandwidth, latency, loss rate, received signal strength (RSS), etc. The surrogate radio 102 may use (and work with) the client 120 to measure the channel metrics. Conventional methods may be used to measure the channel metrics. The scanning may also include performing a CAC for each of the channels.

The surrogate radio 102 scans the channels and provides the channel manager 103 with a channel report that includes channel metrics and channel busy times and the list of APs and clients operating on other channels. The channel manager 103 stores the report. The channel manager 103 also stores channel metrics for a channel currently being used by the master radio 101 for data communications with the client 120. These channel metrics may be measured by the master radio 101. By way of example, FIG. 1 shows channel 16 used by the master radio 101, and channels 20-100 are scanned by the surrogate radio 102. The channel report is stored for channels 20-100, and is updated to include channel metrics and CAC results for channel 16 and channels 20-100. Note that the channel numbers shown are simply provided as an example, and the actual channels used and number of channels used may vary by protocol.

The scanning of channels 20-100 may include using or working with other clients, shown as clients 121, to perform the measurements. Also, the channel metrics, including interference metrics, can be measured using other APs, not shown in FIG. 1, in the wireless network. Furthermore, conventional measurement techniques may be used to measure one or more of the channel metrics.

The channel manager 103 determines whether the data communications need to be switched to another channel. For example, the channel manager 103 may decide to switch to another channel because of performance degradations on the current channel, which can be identified from the channel metrics. Also, the channel manager 103 may decide to switch to another channel because a radar signal is detected.

The channel manager 103 selects a new channel using the channel metrics measured by the surrogate radio 102. A new channel providing better performance is identified and the data communication for the master radio is switched to the new channel. For example, from the channel report, the channel manager 103 determines channel 100 provides better latency and less interference. Also, the CAC determines there is no radar signal detected for channel 100. Then, the data communication with the client 120 is switched to the new channel, which is channel 100 in this example.

The master radio 101 and the surrogate radio 102 are co-located. Co-locating means locating the radios 101 and 102 so they experience the same or similar values for measured channel metrics. This includes providing the radios 101 and 102 in close proximity so the channel metrics measured by one radio, namely the surrogate radio 102, are also applicable to the other radio, namely the master radio 101. If the radios 101 and 102 are far apart, then the channel metrics measured by the surrogate radio 102 may not be applicable to the master radio 101 because of the distance between the radios and resulting difference in channel metrics. This can impact the accuracy of selecting a new channel that provides better performance for the data communication because the channel metrics measured by one radio are not similar to the other. For example, the interference estimated by the surrogate radio 102 should be close to the actual interference experienced by the master radio 101. In one embodiment, the master radio 101 and the surrogate radio 102 are provided in the same device, and are co-located. In other embodiments, the master radio 101 and the surrogate radio 102 may not be in a single device, but they are co-located so they experience the same or similar values for measured channel metrics. Similar may include being within a predetermined threshold or tolerance.

According to an embodiment, the channel manager 103 generates an interference map from the channel report in order to assign a new channel. According to an embodiment, the channel manger 103 requests a node to passively scan a channel for a specified period to detect a list of APs and/or clients and measure RSSs from them to build an interference map. The 802.11k client reporting feature may be utilized to enable access points to request their clients to scan the given channel. The passive scanning includes using a surrogate radio in a network node, which may be an AP, to measure RSSs to build the interference map. The interference map is the interference determined for each AP-client pair measuring RSS.

To detect interference between APs, every AP in the wireless network 110 scans each of C channels, where C is the number of channels in the wireless network 110, for Ta, where Ta is a predetermined monitoring time to find APs in a given channel. Because an AP can monitor the channel it operates on without disruption, the total communication disruption time that each AP suffers from is $(C-1)*Ta$. Likewise, to measure interference from APs to clients, each client needs to leave its current communication channel, such as the communication channel used for its data communications, and scans the other C−1 channels for $(C-1)*Ta$. The APs may multiplex data communications with channel measurements to scan the other C−1 channels.

To measure interference from the clients to the APs, each AP leaves its communication channel for $(C-1)*Tc$, where Tc is a predetermined monitoring time to find clients in a given channel. As for the client-to-client interference, each client leaves its communication channel for $(C-1)*Tc$. Note that an AP or a client can monitor a channel and detect the APs and clients in the channel simultaneously. Thus, the disruption time of each AP and client is bounded by $(C-1)*Tc$ as Tc is larger than Ta. Note that this disruption time is applied to each node independently without requiring the entire network to stop and participate in the measurement. Assuming bidirectional link connectivity (or interference) between APs and clients, the disruption time for each AP is drastically reduced to $(C-1)*Ta$.

During the AP's scan time, no clients associated with the AP can transmit or receive data using the radio performing the scanning. On the other hand, during the client's scan time, the client's AP can communicate with other clients. Thus, the disruption of AP has a larger impact on the system performance than the disruption of clients. However, by using the surrogate radio at the AP to perform the scan, there is no disruption to the clients connected to the AP via the master radio. In other words, to detect the interference between APs, the surrogate radio of each AP performs the scanning of the C−1 channels while the master radio keeps serving its clients in its operating channel. Hence, the service disruption time is zero. The surrogate radio also measures interference from the clients during the channel scanning, and no service disruption occurs when measuring the interference from the clients to the APs.

As described above, when the channel manager 103 determines the channel used by the master radio 101 is to be switched to a new channel, a new channel is selected that provides better performance, and the master radio 101 switches to the new channel. There is a switching delay to switch to the new channel. Testing has shown the total disruption time to switch to a new channel is about 28 ms. In one embodiment, the switching delay is reduced by reversing the roles between the master radio 101 and the surrogate radio 102. The surrogate radio 102 waits in the new channel for the clients (e.g., the client 120) migrating from the old channel (e.g. channel 16) to the new channel (e.g., channel 100) and provides the data communication to the clients instantly in the new channel. The surrogate radio 102 thus becomes the master radio. After all the clients switch to the new channel, the previous master radio 101 takes on the role of the surrogate radio 102. The channel switching delay experienced by the clients can be reduced from 28 ms to 7 ms.

Figure 2:
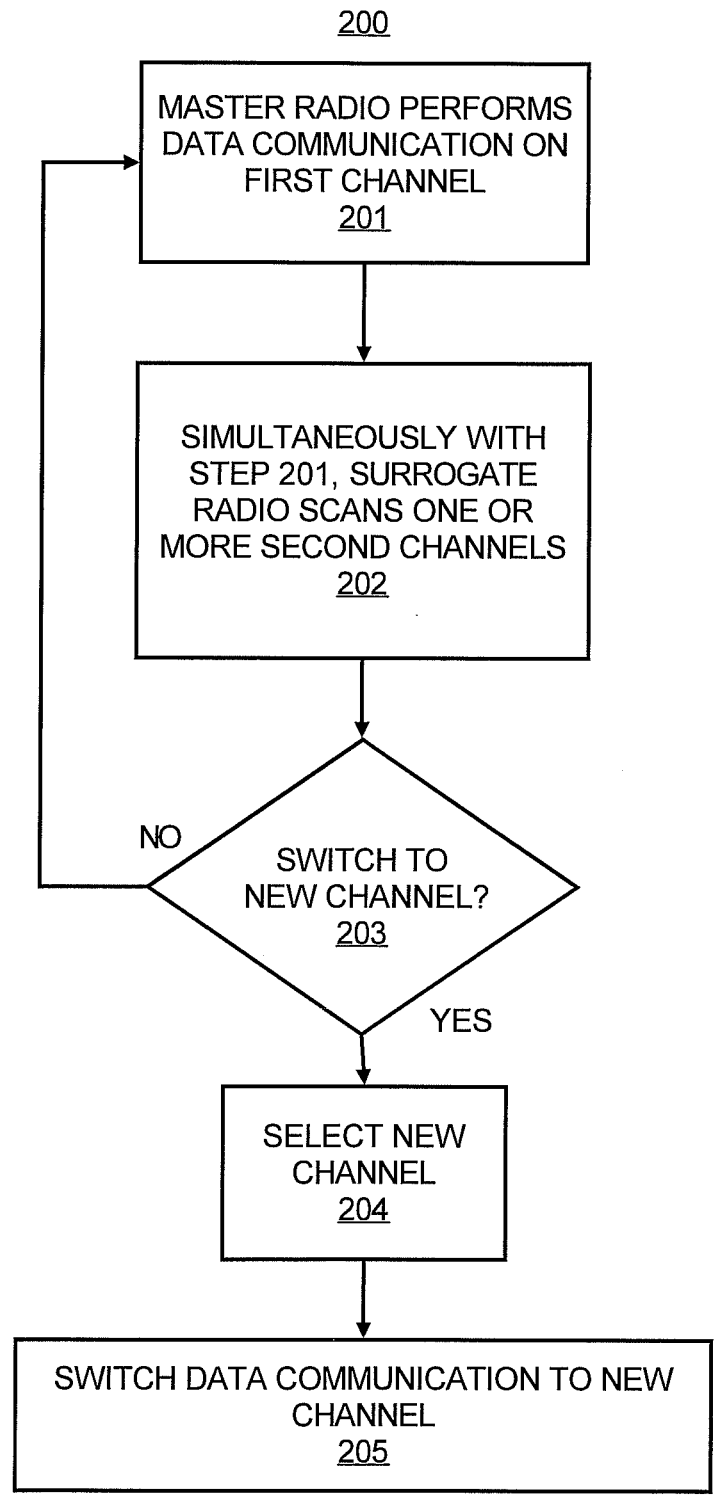
FIG. 2 illustrates a flowchart for channel switching, according to an embodiment.

FIG. 2 illustrates a method 200 for channel switching in a wireless network, according to an embodiment. The method 200 is described by way of example with respect to the system shown in FIG. 1. The method 200 may be practiced in other systems.

At step 201, the master radio 101 co-located with the surrogate radio 102 performs data communication with the client 120 on a first channel, such as the channel 16.

At step 202, simultaneously with step 201, the surrogate radio 102 determines channel metrics for one or more second (alternate) channels, such as the channels 20-100. The channels metrics may be measured and or received from other APs.

At step 203, the channel manager 103 determines whether a switch to a new channel is needed. Channel switching may be caused by a performance degradation on a current channel used by the master radio 101 or when a radar signal is detected on the current channel. Performance degradation may result from interference or another metric falling below a threshold.

At step 204, if a switch is needed, a new channel is selected based on the channel metrics for the one or more second channels. A channel is selected that has the least interference and has channel metrics that are satisfactory, for example, above a predetermined threshold. Channel interference may be determined by generating the interference map. Also, a channel is selected based on a CAC, which may be proactively conducted to reduce switching delay.

At step 205, the data communications are switched to the new channel. This may include the master radio 101 and the surrogate radio 102 switching roles. For example, the surrogate radio 102 performs the data communications with the client 102 on the channel 100, and the master radio 101 becomes the surrogate and performs channel scanning on the other channels. Alternatively, the master radio 101 may switch to the new channel and send the data for the data communication on the new channel.

Figure 3:
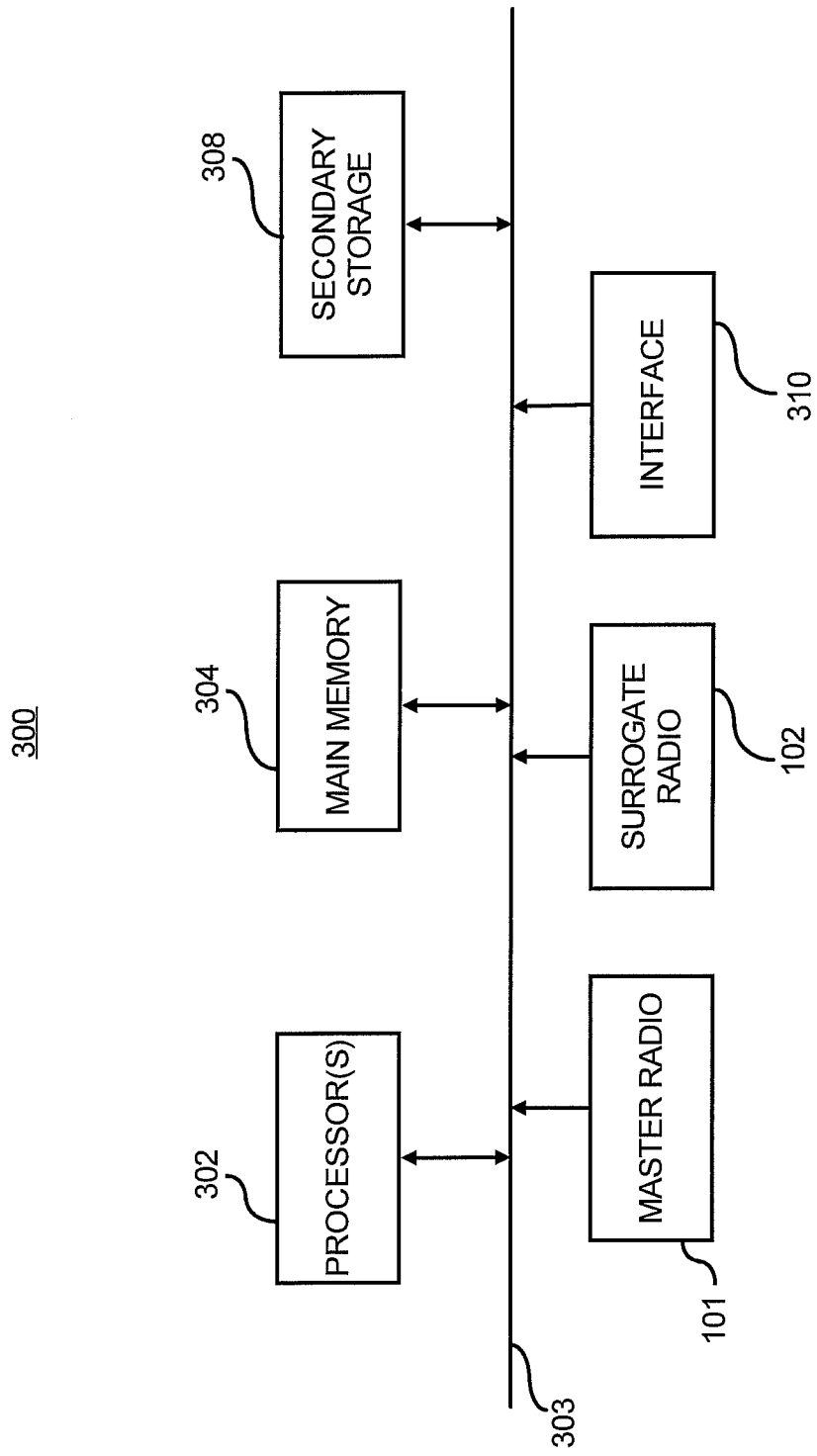
FIG. 3 illustrates a computer system that may be used as a platform for the systems and methods of the embodiments.

FIG. 3 illustrates a block diagram of a general purpose computer system that is operable to be used to execute one or more computer programs implementing the embodiments described herein, including steps described herein. It will be apparent to one of ordinary skill in the art that a more sophisticated computer system is operable to be used. Furthermore, components can be added or removed from the computer system 300 to provide the desired functionality.

The computer system 300 represents a platform for the channel management system 100. The computer system 300 may represent an AP including the channel management system 100. The computer system 300 includes one or more processors or processing circuitry, such as processor 302, providing an execution platform for executing software. Commands and data from the processor 302 are communicated over a communication bus 303. The computer system 300 also includes computer readable storage mediums including a main memory 304, such as a Random Access Memory (RAM), where software is resident during runtime, and a secondary storage 308. The secondary storage 308 may include nonvolatile memory where a copy of the software is stored.

The computer system 300 includes the master radio 101 and the surrogate radio 102. The computer system also include an interface 310. The interface 310 is connected to the radios 101 and 102 via bus 303 to provide wireless data communications that conforms to a standard or protocol. The radios 101 and 102 may be connected to more than one interface. One interface may be used for data communications and the other for channel measurements.

One or more of the steps of the methods described herein and other steps described herein and one or more of the components of the systems described herein may be implemented as software code stored on a computer readable storage medium, such as the memory and/or secondary storage, and executed on a computer system, for example, by a processor. For example, the steps of the embodiments may exist as software program(s) comprised of program instructions in source code, object code, executable code or other formats for performing some of the steps.

While the embodiments have been described with reference to examples, those skilled in the art will be able to make various modifications to the described embodiments without departing from the scope of the claimed embodiments.

What is claimed is:

1. A channel management system in a wireless network comprising:
   a master radio to perform data communication with one or more clients on a first channel in the wireless network;
   a surrogate radio co-located with the master radio and to scan other channels in the wireless network simultaneously with the data communication performed by the master radio; and
   a channel manager to determine if a channel switch is needed based on the scanning by the surrogate radio, and, in response to a determination that the channel switch is needed, switch the data communication with the one or more clients from the first channel to a second channel of the other channels,
   wherein, to switch the data communication with the one or more clients from the first channel to the second channel, the channel manager is to:
   operate the surrogate radio as the master radio to communicate with the one or more clients via the second channel, including connecting the surrogate radio to the second channel to wait for the one or more clients, and allowing the surrogate radio to perform the data communication with the one or more clients on the second channel when the one or more clients migrates from the first channel to the second channel, and
   operate the master radio as the surrogate radio to scan channels other than the second channel in the wireless network.

2. The channel management system of claim 1, wherein the channel manager determines whether there is channel unavailability to determine if the channel switch is needed.

3. The channel management system of claim 2, wherein the scanning by the surrogate radio includes determining availability and channel metrics of each of the other channels.

4. The channel management system of claim 3, wherein the scanning of the other channels includes measuring one or more of latency, bandwidth, loss rate, and received signal strength for the other channels.

5. The channel management system of claim 4, wherein the scanning of the other channels includes measuring interference between the one or more clients and the channel management system and other channel management systems in the wireless network.

6. The channel management system of claim 5, wherein the channel manager selects the second channel from the other channels using at least one of the channel metrics for each of the other channels, the measured interference, and the availability of each of the other channels.

7. The channel management system of claim 3, wherein the scanning includes determining for a predetermined duration whether a radar signal with a power level above a threshold is present on each of the other channels, and a channel is determined to be available if the radar is not detected during the duration.

8. The channel management system of claim 3, wherein the one or more clients includes a plurality of clients and the surrogate radio measures the channel metrics using a subset of the plurality of clients while the master radio performs the data communication with a second subset of the plurality of clients.

9. The channel management system of claim 3, wherein the one or more clients includes a client having two interfaces, and one interface in the client is used for the data communication with the master radio and the other interface in the client is used for measuring the channel metrics with the surrogate radio.

10. The channel management system of claim 1, wherein the master radio and the surrogate radio are connected to an interface and an antenna.

11. The channel management system of claim 1, wherein the surrogate radio and the master radio operate in a same wireless local area network.

12. An access point to send and receive data to and from one or more clients in a wireless network, the access point comprising:
a master radio to perform data communication with the one or more clients on a first channel in the wireless network;
a surrogate radio to scan other channels in the wireless network simultaneously with the data communication performed by the master radio; and
a channel manager to determine if a channel switch is needed based on the scanning by the surrogate radio, and, in response to a determination that the channel switch is needed, switch the data communication with the one or more clients from the first channel to a second channel of the other channels,
wherein, to switch the data communication with the one or more clients from the first channel to the second channel, the channel manager is to:
operate the surrogate radio as the master radio to communicate with the one or more clients via the second channel, including connecting the surrogate radio to the second channel to wait for the one or more clients, and allowing the surrogate radio to perform the data communication with the one or more clients on the second channel when the one or more clients migrates from the first channel to the second channel, and
operate the master radio as the surrogate radio to scan channels other than the second channel in the wireless network.

13. The access point of claim 12, wherein the scanning by the surrogate radio includes determining availability and channel metrics for each of the other channels.

14. The access point of claim 13, wherein the scanning includes determining for a predetermined duration whether a radar signal with a power level above a threshold is present on each of the other channels, and a channel is determined to be available if the radar is not detected during the duration.

15. The access point of claim 13, wherein the one or more clients includes a plurality of clients and the surrogate radio measures the channel metrics using a subset of the plurality of clients while the master radio performs the data communication with a second subset of the plurality of clients.

16. The access point of claim 13, wherein the one or more clients includes a client having two interfaces, and one interface in the client is used for the data communication with the master radio and the other interface in the client is used for measuring the channel metrics with the surrogate radio.

17. A method of channel switching in a wireless network, the method comprising:
performing data communication, by a processor, between a master radio and one or more clients on a first channel in the wireless network;
scanning, by the processor, other channels in the wireless network using a surrogate radio co-located with the master radio, wherein the scanning is performed simultaneously with the data communication;
determining if a channel switch is needed based on the scanning by the surrogate radio; and
in response to a determination that the channel switch is needed, switching, by the processor, the data communication with the one or more clients from the first channel to a second channel of the other channels, by
operating the surrogate radio as the master radio to communicate with the one or more clients via the second channel, including connecting the surrogate radio to the second channel to wait for the one or more clients, and allowing the surrogate radio to perform the data communication with the one or more clients on the second channel when the one or more clients migrates from the first channel to the second channel, and
operating the master radio as the surrogate radio to scan channels other than the second channel in the wireless network.

18. The method of claim 17, wherein the scanning includes determining availability and channel metrics for each of the other channels.

19. The method of claim 17, wherein determining availability includes determining for a predetermined duration whether a radar signal with a power level above a threshold is present on each of the other channels, and a channel is determined to be available if the radar is not detected during the duration.

20. The method of claim 17, wherein the surrogate radio and the master radio operate in a same wireless local area network.

* * * * *